(No Model.) 3 Sheets—Sheet 1.
DE W. C. SANFORD.
Refrigerator and Refrigerator House.
No. 239,344. Patented March 29, 1881.
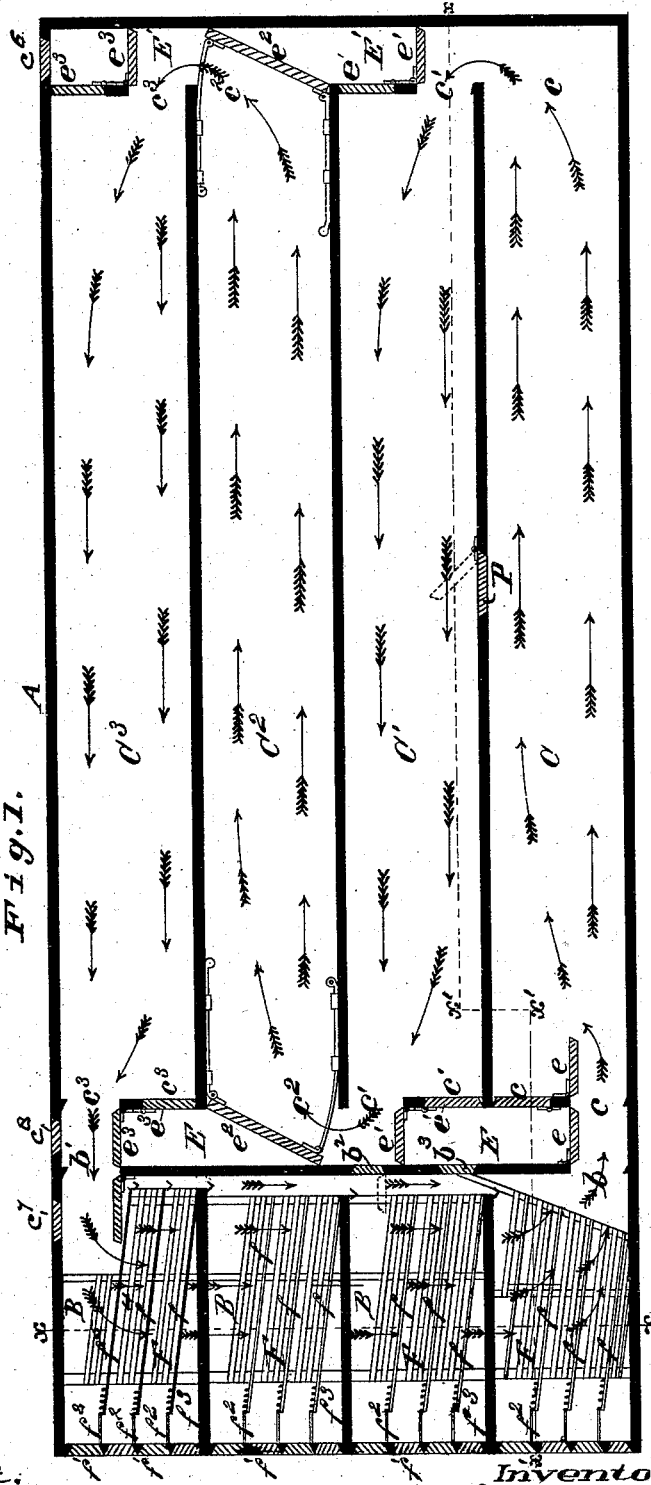
Attest:
Charles Pickles
W. L. Crowson
Inventor:
Dewitt C. Sanford
by C. D. Moody, atty.

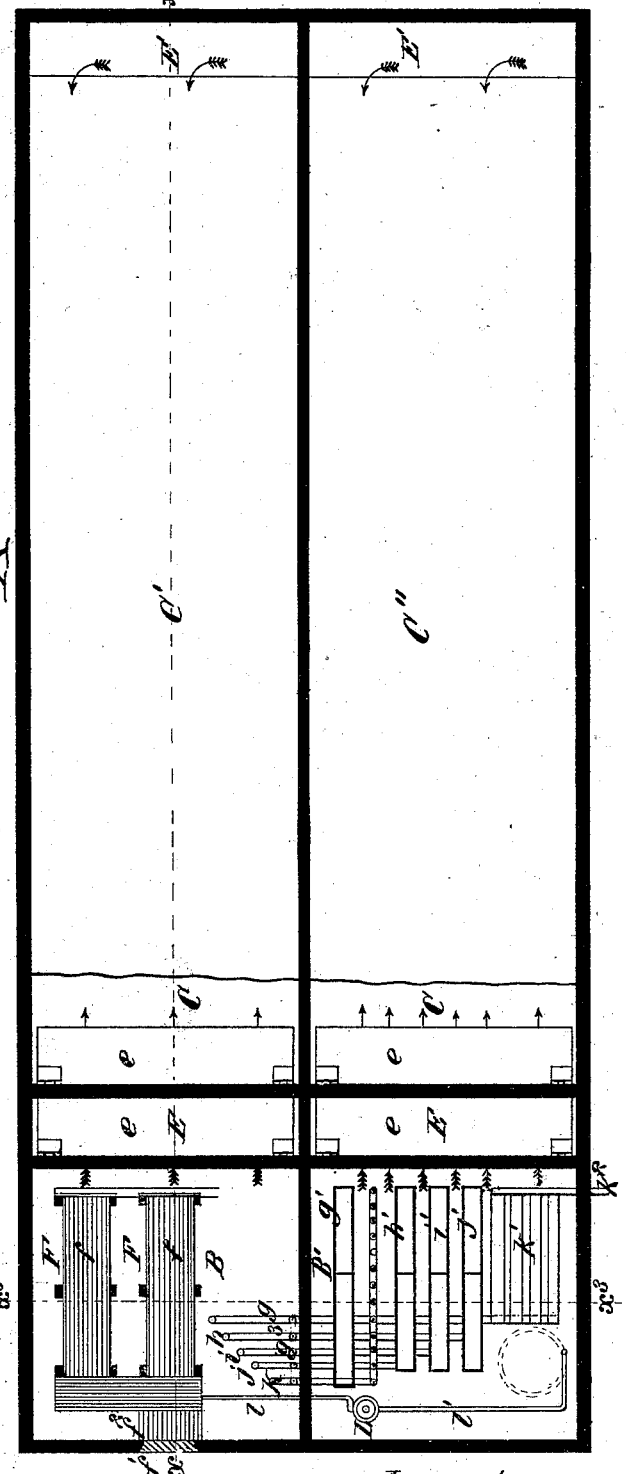

(No Model.) 3 Sheets—Sheet 3.
DE W. C. SANFORD.
Refrigerator and Refrigerator House.
No. 239,344. Patented March 29, 1881.
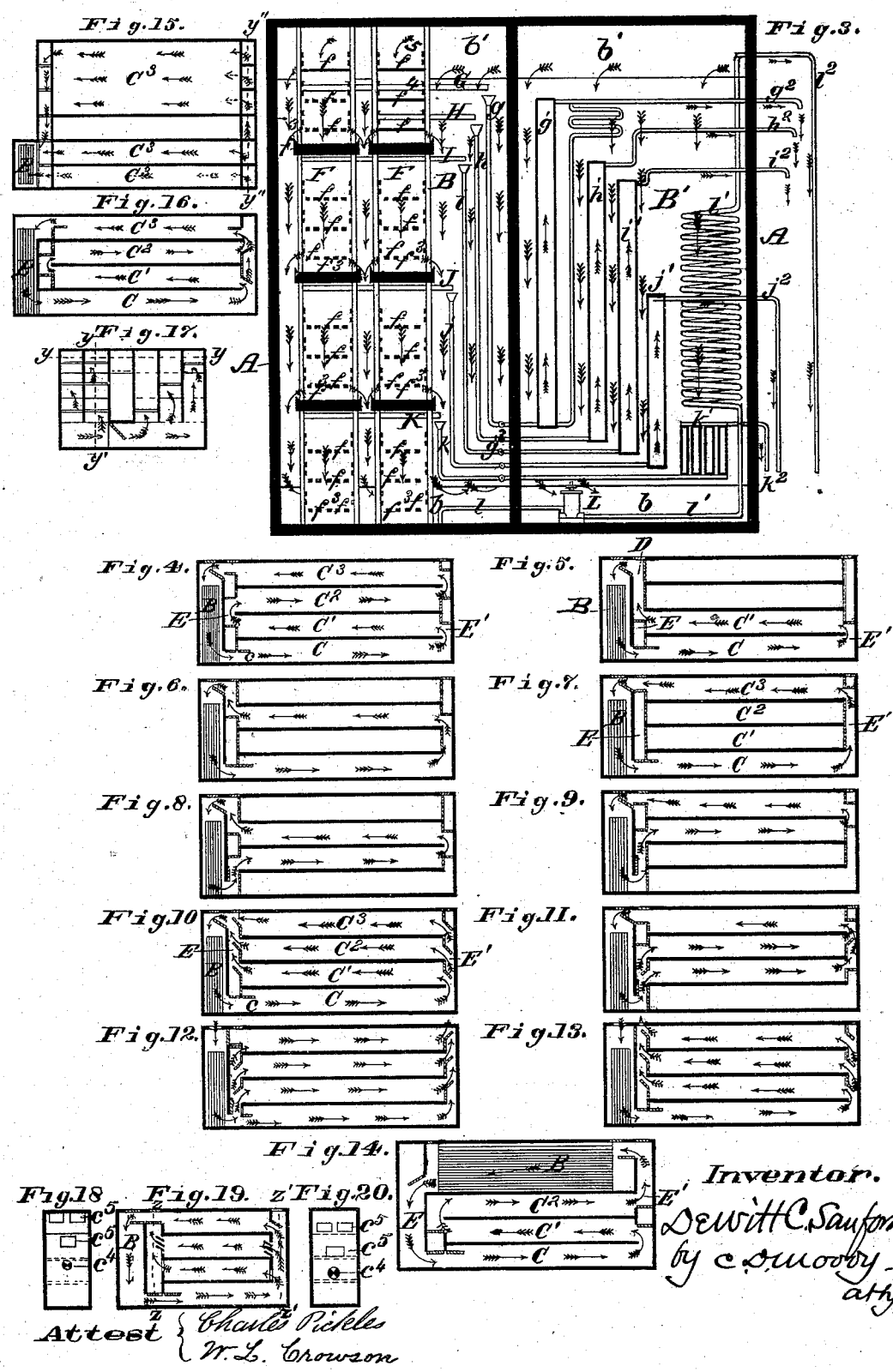
Inventor.
Dewitt C. Sanford
by C. Smooby
atty.
Attest: Charles Pickles
W. L. Crowson

UNITED STATES PATENT OFFICE.

DE WITT C. SANFORD, OF ST. LOUIS, MISSOURI.

REFRIGERATOR AND REFRIGERATOR-HOUSE.

SPECIFICATION forming part of Letters Patent No. 239,344, dated March 29, 1881.

Application filed July 23, 1880. (No model.)

*To all whom it may concern:*

Be it known that I, DE WITT C. SANFORD, of St. Louis, Missouri, have made a new and useful Improvement in Refrigerators and Refrigerating-Houses, of which the following is a full, clear, and exact description, reference being had to the annexed drawings, making part of this specification, in which—

Figure 1 is a vertical longitudinal section taken on the line $x\ x$ of Fig. 2; Fig. 2, a horizontal section taken on the line $x'\ x'$ of Fig. 1; Fig. 3, a vertical transverse section taken on the line $x^3\ x^3$ of Fig. 2; Figs. 4 to 13, inclusive, sectional views, similar to that of Fig. 1, and exhibiting different ways of setting the valves and sending the refrigerating air-currents through the building; Fig. 14, a section similar to those last described, but having the air-cooling chamber on top of the refrigerating-compartments; Figs. 15, 16, 17, sectional views, showing a modification, the air-cooling chamber not extending the full width of the building or buildings, Fig. 15 being a horizontal section taken on the line $y\ y$, and Fig. 16 a longitudinal vertical section taken on the line $y'\ y'$ of Fig. 17, and the latter being a vertical section taken on the line $y''\ y''$ of Fig. 15; and Figs. 18 19 20, sectional views, showing modifications of the openings for admitting and discharging the air into and from the refrigerating-apartments, Fig. 18 being a cross-section on the line $z\ z$, and Fig. 20 a cross-section on the line $z'\ z'$ of Fig. 19.

The same letters denote the same parts.

The present invention is an improvement in refrigerating-houses having an air-cooling chamber and a series of refrigerating-compartments. It relates to the construction of the flues for delivering the air to and for discharging it from the refrigerating-compartments, to the means employed in directing and regulating the flow of the air to and from the refrigerating-compartments, to the construction of the ice-cribs in the air-cooling chamber, to the mode of utilizing the drip-water, and to various details of construction.

Referring to the drawings, A represents a refrigerating-house having the present improvement, B being the air-cooling chamber, and C C' C² C³ a series of any desired number of refrigerating-compartments. The air-cooling chamber may be at or above the level of the refrigerating-compartments—that is, the top of the air-cooling chamber may be even with the top of the refrigerating-compartments, as in Fig. 1; or the air-cooling chamber may extend above the tops of the refrigerating-compartments, as shown in Fig. 5, where the air-cooling chamber B extends above the two compartments C C', and in such last-named case it is necessary to connect the compartment C' with the top of the air-cooling chamber by means of a flue such as shown at D, Fig. 5.

At each end of the series of refrigerating-compartments is a flue, E E', that extends past the ends of the entire series—that is, the flue E is arranged between the air-cooling chamber and the series C C' C² C³, and the flue E' at the opposite end of the series. The air-cooling chamber B, at its bottom $b$ and top $b'$, connects with the flue E, and all of the compartments C C' C² C³ have openings $c\ c\ c'\ c'\ c^2\ c^2\ c^3\ c^3$ into the flues E E'. These openings are furnished with doors or valves $e\ e'\ e^2\ e^3$, which, when turned to close the openings, form parts of the walls of the flues E E'. To operate most efficiently, these doors or valves should be arranged and proportioned so that when fully opened they will close the flues, as shown at $e\ e'\ e^2$, Fig. 1. When the compartments C C³ (to illustrate the working of the flues) are open into the flues E E' and the other compartments C' C² closed and the passages $b\ b'$ opened the air will flow out of the air-cooling chamber into the flue E. It will then divide a portion of it passing through the flue E directly to the opening $b'$, and the remainder through the compartment C, flue E', compartment C³, flue E to the opening $b'$, where the two currents uniting will enter the chamber B through the opening $b'$.

By referring to the various figures of the drawings it will be seen that by suitably operating the various doors or valves the refrigerating air-current may be directed and made to flow horizontally in either direction through any or all the compartments, saving that through the first compartment, C, it can only flow from the air-cooling chamber and through the last compartment, C³, only toward the air-cooling chamber, saving when it is desired to ventilate the compartment C³ at c⁶. The air also may be made to pass from one compartment into another, or each compartment may be furnished with an independent air-current, as desired, by suitably operating the valves or doors, as in Figs. 4 to 13.

The flues E E' may be extended the entire width of the building or refrigerating-compartments, each one being in common for all the stories or refrigerating-compartments, each compartment drawing its needed supply from the flues and also discharging into them; or the flues may be divided by partitions, as desired, so that each story or apartment may have its separate and independent supply and discharge flue, as in Fig. 17. The size and character of the flues, as well as all parts of the house, should be proportioned to the respective requirements, and to other parts of the house. The flues E E' may be termed "return-flues" and also "supply-flues." They supply the air at one end of the refrigerating-compartments and exhaust it at the other, and the flues are convertible at will into either supply or return flues, as it is desired to direct the flow of the air.

The doors or valves may be constructed in any manner consistent with the aims of the improvement, as above set forth, the preferable forms being those shown. In houses or compartments where but a limited quantity of air is required the valves may be made in the form of registers, as at $c^4$, Figs. 18 20, or, as at $c^5 c^5$, Figs. 18 20.

The improvement further relates to the construction of the ice-cribs when ice is used for cooling the air in the chamber B.

To secure as much cooling-surface as possible, a series of two or more detached vertical ice-cribs, F F, are used. The sides or bottom, or both sides and bottom, are made as open as the security of the ice will permit. To act most efficiently, the various cribs should be made as narrow as the size of the cakes of ice used will permit, and leaving only sufficient space between the cribs for a free descent of the air that is to be cooled. To further increase the cooling efficiency of the cribs and of the air cooling-chamber, a series of elevated floors or gratings, $f\,f$, are introduced into the cribs at sufficient distance above one another to freely admit the ice, thereby exposing all sides of each cake of ice to the air and providing easy access thereto. The cakes of ice thus arranged upon and throughout the cribs constructed as described form, in effect, a cellular mass of ice extending throughout the air-cooling chamber, thereby obtaining an air-cooling surface vastly greater in extent than if the same cakes of ice were placed compactly together. The ice is fed into the different stories of these cribs through their respective doors $f'\,f'$, and from the slides $f^2\,f^2$ opposite their ends or sides. A sufficient slant or pitch is given to the length of the floors or gratings $f\,f$, so that when ice is fed to them at one end it will slide the entire length of the floors, or so much thereof as is unfilled. It is preferable, for the purpose of easy access, and also for a free circulation of air, that the ice-cribs should be divided vertically into sections as narrow as is practicable, and with a vertical air-space between each section and the next one; but this is not essential when the supports $f\,f$ are open gratings, as the air can descend between the bars or slats. When the supports $f\,f$ are tight floors the crib-sections must be spaced apart. When the crib is divided vertically the ice is kept in place by slats on the sides of the cribs. It is not intended to place ice on these cribs for the purpose of storing and keeping it, but for the purpose of giving it the greatest facility for speedily absorbing the heat conveyed to the ice by the moving air from the articles being refrigerated. It is the intention that ice for keeping be stored in a separate building or in another part of the same building, and that it be fed into the cribs as required for immediate consumption, as fuel is fed to a furnace. One great advantage of this arrangement of the ice is that it enables freshly-slaughtered animals to be chilled in the hottest weather quick enough to prevent the slightest decomposition, and thereby insure their preservation subsequently by the usual curing processes.

Ice-cribs constructed as above described are now, and for some time past have been, in use in connection with chill-rooms extending one hundred and eighty feet in length from the air-cooling chamber, the chill-rooms being regularly filled with hot carcasses from day to day, the carcasses becoming thoroughly chilled in twenty-four hours.

The improvement further relates to the utilization of the drip-water and the manner of applying a liquid or gaseous refrigerant in an air-cooling chamber.

Drip-water for cooling purposes cannot be applied with the best results in the air-cooling chamber wherein it is formed unless it is used and discharged at a higher level than that at which it is formed or collected, as described in my patent No. 217,552, because only by its application to air of a higher temperature, and necessarily at a higher level in the chamber, is the drip-water enabled to absorb heat and carry it off when discharged.

To enable the drip-water to be used effectively at any level in an air-cooling chamber, to readily elevate it in the air-cooling chamber wherein it is used, and also to apply it as a movable refrigerant to the best advantage, is the aim of this portion of the improvement.

By means of the catch-waters or pans $f^3\,f^3$, which at various levels extend horizontally throughout the cribs, and also by means of the supports $f\,f$, when the latter are tight shelves or floors, as at $f^4\,f^5$, the cribs are divided into stories, and the drip-water of the ice in the various stories is collected in the pans $f^3\,f^3$, respectively, beneath them—that is, the drip-water of the ice in the uppermost story is collected in the uppermost pan, and so on down to the lowest story. A trough, G, conveys the drip-water from the uppermost pan, $f^5$, to a pipe, $g$, that extends downward to the lower part of the chamber B; thence horizontally into another air-cooling chamber, B′, in which the pipe is extended upward nearly to the level of the upper end of the pipe $g$ in the chamber B. The extension $g'$ of the pipe $g$ may be enlarged, and of any desirable shape, for increasing its cooling-surface. The water is discharged from the cooler $g'$ through the pipe $g^2$. From the second uppermost pan, $f^4$, a trough, H, conveys the drip-water to the pipe $h$, which descends and passes into the chamber B′, where it is extended upward at $h'$ and discharged at $h^2$, nearly at the level of the top of the pipe $h$. Similar troughs I J K, pipes $i\ j\ k$, extensions $i'\ j'\ k'$, and discharge-pipes $i^2\ j^2\ k^2$ convey and discharge the water from the remaining pans $f^3\ f^3\ f^3$. The drip-water from the bottom of the ice-crib can, by means of the pump L, suction-pipe $l$, piping $l'$, and discharge-pipe $l^2$, be forced upward through the chamber B′ to any desired level therein and discharged accordingly. This construction is useful in various ways. The drip-water, by being used in a separate air-cooling chamber, can be applied to advantage in cooling at or below the level at which it is formed and collected, and by dividing the ice-cribs into stories the drip-water automatically flows upward in the chamber B′ to the same levels at which it is collected in the chamber B; but by introducing the drip-water into the chamber B′ at the bottom thereof, and causing it thence to well upward through suitable coolers, such as $g\ h'\ i'j'k'\ l'$, this important advantage is obtained: the flow of the refrigerant is in the opposite direction to that of the air being cooled. The refrigerant, as it flows upward through the coolers $g'$, $h'$, $i'$, &c., grows warmer and warmer, and the air, as it flows downward past the coolers, becomes cooler and cooler. The coldest air is thus brought in contact with the coldest portion of the coolers, and the warmest air encounters the warmest portion of the coolers. This enables the operator to develop the maximum efficiency of the refrigerant, for by regulating the flow of the refrigerant through the coolers $g'$, $h'$, $i'$, &c., the water can be discharged from the air-cooling chamber at or very near the same temperature or temperatures of the incoming air, or of the air immediately opposite or at the level of the point or points of the discharge of the refrigerant.

The chamber B′, with its coolers $g'$, $h'$, &c., may be used in connection with a refrigerating compartment or compartments, such as C″, Fig. 2, that are independent of the compartments C C′ C² C³, or any other form of refrigerating apartment or apartments.

The openings for admission of air into the refrigerating-compartments should be at the lower part thereof, and those for the discharge of air should be at the upper part thereof. The air flows horizontally through the refrigerating-compartments. So far as the compartments C C′ C² C³ and flues E E′ are concerned, any refrigerant or apparatus for refrigerating may be used.

Either one of the refrigerating-compartments may be used as a return-flue to any of the other refrigerating-compartments that may be between it and the opening $b$, or as a supply-flue to any beyond it.

If at any time the work to be performed in any one of the refrigerant-compartments should not be sufficient to require the use of the entire length of the apartment, then the apartment may be shortened by means of an opening, as at P, Fig. 1, through the floor, ceiling, or partition of said apartment, which would permit the current of air to make its circuit without traveling through the unused part of the apartment in order to reach the opening at the end thereof. In all cases when not used as above stated said opening should be kept closed, in order to compel the air to travel to the opening at the extreme end of the apartment, and thereby secure a circulation of the air throughout the entire length of the apartment.

The present building is supposed to have a suitable roof over it. The building may be ventilated at $c^7\ c^8$ as well as at $c^6$, and also at any other suitable point.

There may be a door or doors, such as shown at $b^2$, for returning the air to the chamber B from the flue E, whenever the ice in the chamber B is below the level of such door, and thus avoid the necessity of passing the air throughout the entire height of the flue E, and there may be doors, such as at $b^3$, for drawing from the air-cooling chamber from different altitudes therein and of different temperatures.

The above description, saving when the terms "vertical series" or "horizontal series" are especially named, is applicable equally to a vertical or a horizontal series of refrigerating-compartments.

I claim—

1. The combination, in a refrigerator or refrigerating-house, of the air-cooling chamber B, the series of horizontally-extended compartments C C′ C² C³, and the flues E E′, said flues extending past the ends of the entire series, substantially as and for the purpose described.

2. The combination of the air-cooling chamber B and the series of horizontally-extended compartments C C′, said chamber extending above the uppermost compartment and being connected with the latter by means of the flue D, substantially as described.

3. The combination of the horizontally-extended compartments C C′ C² C³ and the flues E E′, said compartments opening into said flues, and having doors or valves $e\ e'\ e^2$, which, when turned to close the openings, form parts of the walls of the flues, substantially as described.

4. The air-cooling chamber B, having the detached ice-cribs or holders F F, substantially as described.

5. In an air-cooling chamber, an ice crib or holder having a series of floors or gratings, $f\,f\,f$, as and for the purpose described.

6. An air-cooling chamber having a series of detached ice-cribs, F F, or holders, each of said cribs or holders having a series of floors or gratings, $f\,f$, as and for the purpose described.

7. The air-cooling chamber B, having the doors $f'\,f'$, slides $f^2\,f^2$, and the cribs F F, the latter having the floors or gratings $f\,f$, substantially as described.

8. In an air-cooling chamber, an ice crib or holder divided into stories by means of the pans $f^3\,f^3\,f^3$ or floors $f^4\,f^5$, substantially as described.

9. The combination of the chambers B B', crib F, pans $f^3\,f^3\,f^3$, floors $f^4\,f^5$, troughs G H I J K, pipes $g\,h\,i\,j\,k$, extensions or coolers $g'\,h'\,i'\,j'\,k'$, and discharge-pipes $g^2\,h^2\,i^2\,j^2\,k^2$, substantially as described.

10. The combination of the chambers B B', crib F, pan $f^3$, trough G, pipe $g$, cooler $g'$, and pipe $g^2$, substantially as described.

11. An ice-holder having a vertical series of ice-supports for the purpose of separating the cakes of ice and exposing them to the surrounding air.

12. An ice-holder having a vertical series of perforated or open-work ice-supports for the purpose of separating the cakes of ice and exposing them to the surrounding air.

D. W. C. SANFORD.

Witnesses:
CHAS. D. MOODY,
CHARLES PICKLES.